United States Patent [19]

Fost

[11] Patent Number: 4,780,728

[45] Date of Patent: Oct. 25, 1988

[54] FLUID JET MARKING APPARATUS

[75] Inventor: Ian M. Fost, Manea, England

[73] Assignee: Domino Printing Sciences PLC, Cambridge, England

[21] Appl. No.: 95,684

[22] Filed: Sep. 14, 1987

[30] Foreign Application Priority Data

Sep. 15, 1986 [GB] United Kingdom ................ 8622196

[51] Int. Cl.[4] ........................ G01D 15/16; B05C 5/02

[52] U.S. Cl. .................................... 346/1.1; 118/313; 346/75; 346/140 R

[58] Field of Search .......................... 346/140, 1.1, 75; 118/313; 400/126, 121

[56] References Cited

U.S. PATENT DOCUMENTS 4,203,554 5/1980 Zimmer .............................. 239/585

4,254,643 3/1981 Mitter ............................ 400/121 X 4,576,111 3/1986 Slomianny ...................... 346/140 X

*Primary Examiner*—Joseph W. Hartary

*Attorney, Agent, or Firm*—Robbins & Laramie

[57] ABSTRACT

A fluid jet marking apparatus comprises a housing (5) defining a chamber (6) for marking fluid. A plurality of outlet nozzles (8) allow ink to be ejected from the chamber and a corresponding plurality of closure elements (9) are selectively displaceable to open and close the nozzles. Springs (11) bias the elements to close the nozzles. A plurality of solenoids (14) are each connected to a respective closure element by means of a pulling element (12) slidable, under the action of the solenoid, in a respective tube (13,13') connecting the solenoid to the housing. A fluid supply (23) supplies fluid to the chamber and at least one liquid constituent part of the fluid is supplied to the chamber through the respective tubes (13') on which the solenoids are mounted.

8 Claims, 2 Drawing Sheets

FLUID JET MARKING APPARATUS

The present invention relates to fluid jet marking apparatus of the "on-demand" type, and more particularly to ink jet marking apparatus of the type claimed and described in our British Pat. No. GB-B-2134452.

In GB-B-2134452 we describe and claim a marking jet discharging head assembly having a chamber for fluid marking material, means defining a plurality of outlet orifices from said chamber, a plurality of closure elements which are selectively displaceable to open and close respective outlet orifices, resilient means arranged to urge said elements to close the orifices; a plurality of pulling means actuable to effect pulling and associated with respective closure elements and spaced therefrom, and a plurality of elongate pulling elements connecting the closure elements to respective pulling means so that the pulling means are actuable to pull respective elements against the urging of the resilient means to open respective orifices.

This type of apparatus was developed to overcome problems associated with ink jet marking apparatus, of the prior type which required multiple operating valves, one for each jet, for example as shown in U.S. Pat. No. 4,215,350 and WO-A-8501103.

The British patent specification describes an example in which the pulling elements are flexible wires taken out through a bore in the rear wall of the chamber and passing through respective flexible tubes on which, at their rear ends, are mounted electromagnetic solenoids, a solenoid slug being attached to the wire at this position for actuation by the solenoid coil. Ink is supplied to the chamber from an ink supply system under pressure and it is released for marking of articles through the nozzles by actuation of the respective solenoids to move the solenoid slugs, thus pulling the respective wires to open the nozzles. In practice ink is pressurized to a relatively low pressure, within a range of from 2 to 20 psi., e.g. 7 psi., and the viscosity of the inks normally used is such that the provision of seals to prevent ink from flowing into the tubes connecting the solenoids to the housing of the chamber, is not necessary. This is advantageous as the fitting of small seals can be a time consuming step in the manufacturing process. Furthermore, the provision of seals may require stronger electromagnetic solenoids to be used.

However, certain marking fluids, for example inks, of low viscosity, when used with apparatus of this type, cause previously unforseen problems. In particular, it is found that the ink wicks into the tubes connecting the solenoids to the ink chamber up to the area around the slug. This is problematic in that although the rear of the central bore of the solenoid mounting tube is closed to atmosphere so that ink cannot escape, particularly with a high frequency cycling of operation of the solenoid, the solenoid armature heats up, increasing the temperature of the ink and, particularly if the ink is solvent based, evaporating the solvent, eventually causing the ink to dry in the mounting tube around the solenoid slug and preventing the satisfactory operation of the assembly. Conventional solvents include water, glycols, and lower alcohols such as ethanol, iso-propanol or metyl ethyl ketones.

An object of the present invention is to overcome this problem so as to ensure that the apparatus continues to work satisfactorily over long periods of time under high frequency operation of the solenoids.

According to the present invention therefore a fluid jet marking apparatus comprises a housing defining a chamber for marking fluid; a plurality of outlet nozzles from the chamber; a corresponding plurality of closure elements selectively displaceable to open and close the nozzles; resilient means biasing the elements to close the nozzles; a plurality of solenoids each connected to a respective closure element by means of a pulling element slidable, under the action of the solenoid, in a tube connecting the solenoid to the housing; and a fluid supply supplying fluid to the chamber, characterized in that at least one liquid constituent part of the fluid is supplied to the chamber through the respective tubes on which the solenoids are mounted.

The invention also includes a method of operating such a marking apparatus, the method including supplying at least one liquid constituent part of the fluid to the chamber through the respective tubes on which the solenoids are mounted.

By this means, in operation, a continual flow of fluid through the solenoid mounting tubes to the chamber prevents the build up of particles of ink constituents within the solenoid mounting tubes, at the same time acting to cool the solenoid thereby further overcoming the problems associated with solvent evaporation and residual ink.

In some cases the supply path through the solenoid mounting tubes may constitute the sole means of supply of ink to the chamber, but in other cases, where the ink is solvent based, ink may be supplied directly to the chamber from the ink supply and solvent alone supplied to the chamber through the solenoid mounting tubes.

Preferably, the supply of fluid through the solenoids and tubes is from a manifold into which supplies of both solvent and ink are controllably fed, so that on shutdown, the supply of ink to the manifold can be shut off allowing solvent for flushing to be fed through the apparatus to flush the system. This way, the solenoids, associated tubes and chamber, together with the nozzles, can be arranged to be flushed with solvent when the apparatus is switched off in order to prevent a buildup residue of ink particles from clogging the apparatus while it is switched off.

An example of apparatus constructed in accordance with the present invention will now be described with reference to the accompanying drawings n which:

Figure 1:
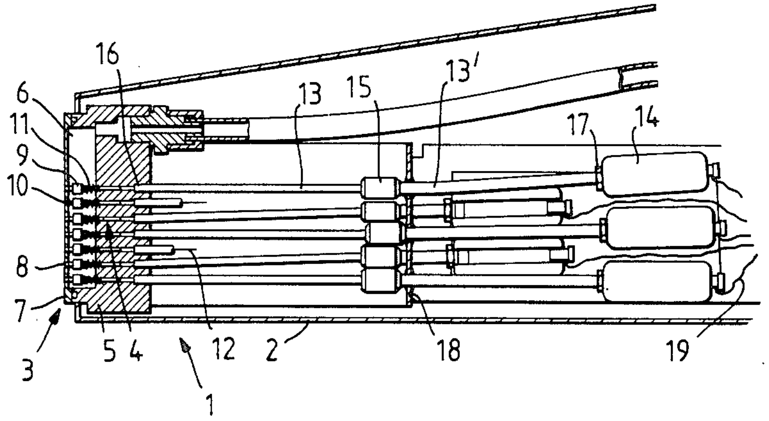
FIG. 1 shows a sectional elevation of part of a typical ink jet marking apparatus according to the invention.

The apparatus shown in FIG. 1 includes an ink jet discharging head assembly 1 having a supporting frame 2 and, at its front 3, a nozzle assembly 4 having a housing 5 defining an ink chamber 6. The ink chamber has a front plate 7 through which a plurality of jewelled nozzles 8 extend in a row, (five are shown in FIG. 1, but the number is variable as required) each of the nozzles being arranged to be closed by a closure member 9 having a rubber tip 10. Each of the closure elements is resiliently biased to its closed position by a coil spring 11 which surrounds a pulling element in the form of a flexible wire 12, between the back of the closure element 9 and the rear wall of the chamber. The wire pulling elements 12 extend through flexible tubes 13 and respective solenoid mounting tubes 13′ to respective electromagnetic solenoids 14 where they are attached to solenoid slugs 14'. The solenoids 14 are mounted on respective solenoid mounting tubes 13' and the tubes 13 and 13' are connected by respective screw threaded fastenings 15 16 and 17 to one another, the chamber 6 and the respective solenoids 14. The solenoids are supported on a bracket 18 and are actuated from a control system (not shown) through current carrying wires 19.

Figure 2:
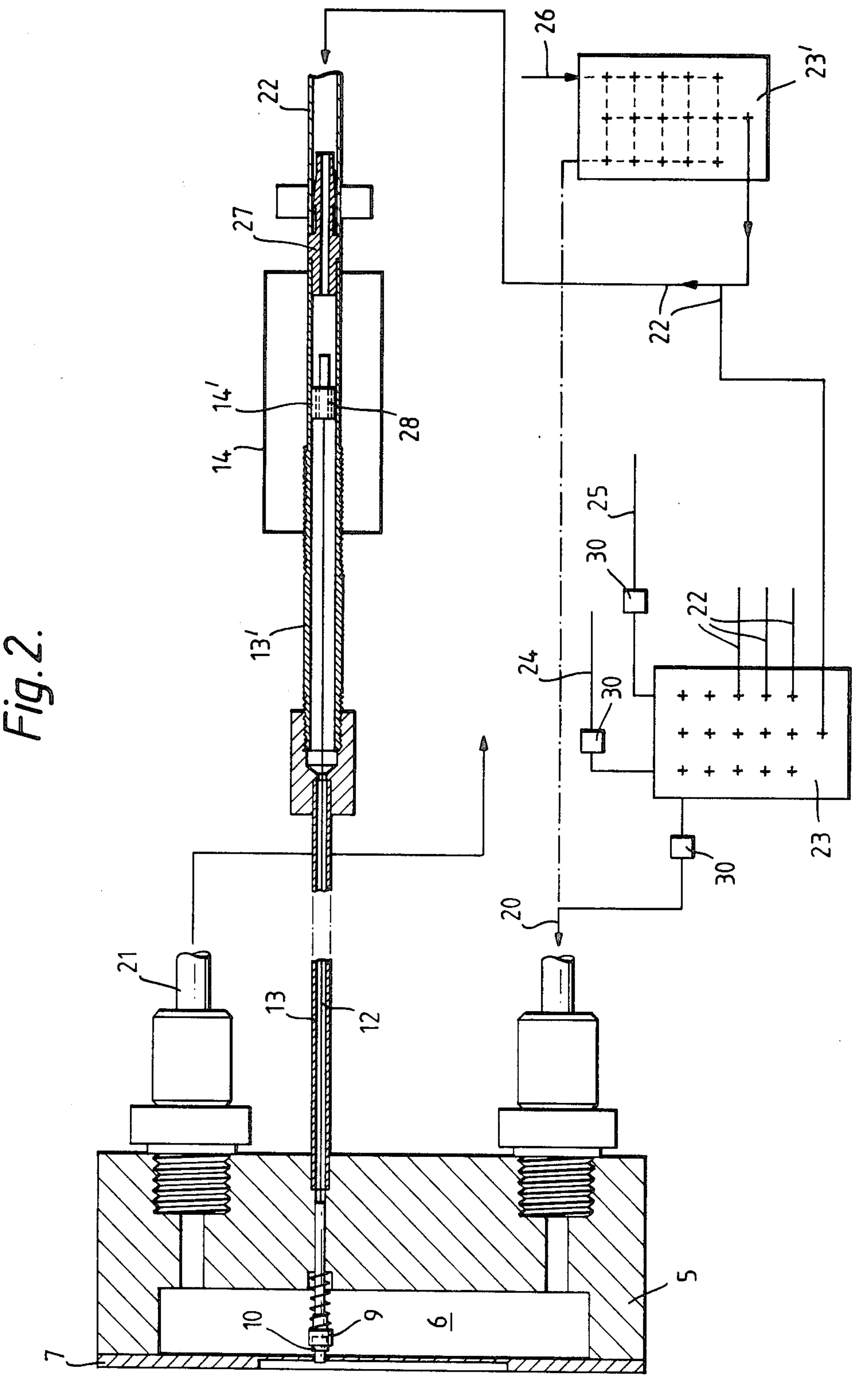
FIG. 2 shows a portion of the apparatus in more detail.

FIG. 2 shows detail of the apparatus, but for clarity shows only one closure element and its associated control elements, etc.

This particular apparatus is designed to use a solvent based ink (comprising dye, binders and solvent) having a nominal working viscosity of 5 cP, the solvent itself having a nominal viscosity of 1 cP.

FIG. 2 shows an optional conventional ink feed line 20 and optional drain line 21. Feed to the solenoids is through lines 22 extending from a distribution block manifold 23 which may be fed, in the present example, with both solvent and ink through the respective solenoid valve 30 controlled feed lines 24,25. An alternative, shown to the right hand side of the figure, indicates a simple distribution block 23' fed with ink through a valve supply line 26. Many other variations are possible.

In the arrangement shown ink and solvent are preferably fed through the line 22 to the rear of the solenoid mounting tube 13', the line being connected by means of a simple conventional fitting 27, to the back of the solenoid. Alternatively, ink is fed through the line 20 to the chamber and solvent alone is fed through the lines 22.

Ink/solvent flows through the solenoid mounting tube 13' which passes through the middle of the solenoid 14 around and through axial holes 28 formed in the solenoid slug 14' which is attached to the pulling element wire 12 and operated on by the armature of the solenoid.

Figure 3A:
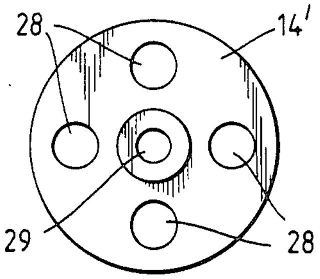
FIGS. 3A & 3B illustrate a solenoid slug used in the apparatus.
Figure 3B:
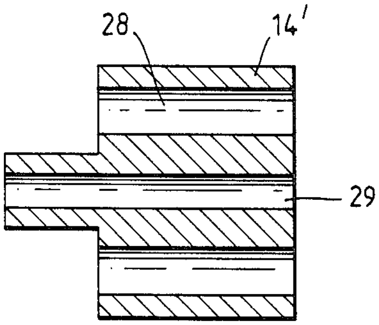

The solenoid slug 14' and its axial passages 28 are more clearly detailed in FIGS. 3A and 3B. The slug is formed of magnetic steel and has a diameter of 3.9 mm to provide a free sliding fit within the tube 13' which has an internal diameter of 4.07 mm in the section which lies within the solenoid 14. The passages 28 are equi-angularly spaced around the axis of the slug 14' and each of the passages 28 has a diameter of 0.75 mm. A centre hole 29 is used to receive the respective pulling wire 12 to which the slug is fixed.

It will be appreciated that, depending upon the specific use to which the apparatus is being put, and thus the type of ink that is being used, solvent, other constituant parts of the ink, or the completed ink may be fed through the line 22 to the solenoid tubes with optional supply of the same or other components through the conventional feed line 20.

In the present embodiment solvent will be flushed through the solenoid mounting tubes 13' and tubes 13 during the shut down procedure in order to clear the apparatus of ink which might otherwise thicken by solvent evaporation and cause it to be blocked when it is shut down. The solenoids and closure elements are preferably operated at high frequency in order to clear ink from the system and/or ink is drained out through the drain line 21, and the ink is replaced by solvent.

The technique of the invention is clearly applicable to a wide range of applications of this printing method, including printing with conventional inks, solvent based inks and others, the precise configuration of the apparatus and supply of ink to the solenoid mounting tubes varying as necessary.

I claim:

1. A fluid jet marking apparatus comprising:

a housing defining a chamber for marking fluid;

a plurality of outlet nozzles from said chamber;

a corresponding plurality of closure elements within said chamber selectively displaceable to open and close said nozzles;

resilient means biasing each of said elements to close said nozzles;

a corresponding plurality of solenoids each connected to a respective closure element by means of a pulling element;

a corresponding plurality of tubes mounting and connecting said solenoids with said chamber, each said pulling element being slidable, under the action of a respective one of said solenoids, in a respective one of said tubes; and a fluid supply supplying fluid to said chamber, wherein:

means is provided for supplying at least one liquid constituent part of said fluid to said chamber through the respective tubes on which said solenoids are mounted.

2. A fluid jet marking apparatus according to claim 1, wherein said means of supply through said solenoid mounting tubes constitutes the sole means of supply of fluid to said chamber.

3. A fluid jet marking apparatus according to claim 1, the apparatus being arranged and constructed to use as the marking fluid an ink which includes an ink solvent component, and wherein ink is supplied directly to said chamber from said ink supply and ink solvent is supplied to said chamber through said solenoid mounting tubes.

4. A fluid jet marking apparatus according to claim 3, further including a manifold through which said supply of fluid is adapted to pass to said tubes, and into which supplies of both solvent and ink are controllably fed, whereby, on shut-down of the apparatus, the supply of ink to the manifold can be shut off allowing solvent for flushing to be fed through the apparatus to flush the system.

5. A method of operating a fluid jet marking apparatus which comprises a housing defining a chamber for marking fluid; a plurality of outlet nozzles from the chamber; a corresponding plurality of closure elements selectively displaceable to open and close the nozzles; resilient means biasing the elements to close the nozzles; a plurality of solenoids each connected to a respective closure element by means of a pulling element slidable, under the action of the solenoid, in a respective mounting tube connecting the solenoid to the housing; and a fluid supply supplying fluid to the chamber, said method comprising supplying at least one liquid constituent part of said fluid to said chamber through said respective tubes on which said solenoids are mounted.

6. A method according to claim 5, wherein fluid is supplied to said chamber solely through said solenoid mounting tubes.

7. A method according to claim 5, wherein said marking fluid is an ink which includes an ink solvent component, and wherein ink is supplied directly to said chamber from said ink supply and solvent is supplied to said chamber through said solenoid mounting tubes.

8. A method according to claim 7, wherein the supply of fluid through said solenoids and tubes is from a manifold into which supplies of both solvent and ink are controllably fed, and, on shut-down, the supply of ink to said manifold is shut off and solvent is fed through the apparatus to flush the system.

* * * * *